United States Patent [19]
Schoepe et al.

[11] 3,916,454
[45] Nov. 4, 1975

[54] FLOAT FOR BALL COCKS AND THE LIKE

[76] Inventors: Adolf Schoepe, 1620 N. Raymond Ave., Fullerton, Calif. 92631; Fredric E. Schmuck, 535 Century Drive, Anaheim, Calif. 92805

[22] Filed: Jan. 2, 1974

[21] Appl. No.: 429,736

[52] U.S. Cl. .......................... 4/56; 4/41; 73/322.5; 137/432; 137/434
[51] Int. Cl.² ...................... E03D 1/34; F16K 33/00
[58] Field of Search .............. 4/56, 67 A, 57 P, 41; 73/322.5; 137/432, 433, 434

[56] References Cited
UNITED STATES PATENTS

| | | | |
|---|---|---|---|
| 2,394,437 | 2/1946 | Freeman | 73/322.5 X |
| 3,194,070 | 7/1965 | Grant | 137/432 X |
| 3,254,665 | 6/1966 | Bachli et al. | 137/432 X |
| 3,428,078 | 2/1969 | Christopher | 73/322.5 X |
| 3,428,966 | 2/1969 | Schoepe et al. | 4/56 |
| 3,554,219 | 1/1971 | Hudson | 137/432 |
| 3,584,644 | 6/1971 | Morken | 137/432 |
| 3,610,271 | 10/1971 | Jarvis | 73/322.5 X |
| 3,829,636 | 8/1974 | Scott | 73/322.5 X |

Primary Examiner—Henry K. Artis
Attorney, Agent, or Firm—Mahoney, Schick & Cislo

[57] ABSTRACT

Upper inverted cup-shaped and lower cup-shaped parts are assembled with the upper part skirt-like slightly telescoping the lower part forming an annular water inlet therebetween into the float interior. Spaced projecting portions of the parts establish proper spacing and abutment assuring an exact proper assembly. An internal upper part air vent tube opens upwardly through an upper part top surface and opens downwardly into the lower part establishing the water level within the float from the annular water inlet. A guide opening through the float is established by internal tubular portions of the parts which telescope and snap engage during assembly for retaining such assembly.

14 Claims, 8 Drawing Figures

FLOAT FOR BALL COCKS AND THE LIKE

BACKGROUND OF THE INVENTION

This invention relates to a float for ball cocks and the like, and more particularly, to such a float for controlling the water or other liquid level in tanks and other liquid containers by automatically regulating a liquid flow controlling valve which determines the water or other liquid level maintained in the tank. Furthermore, the float of the present invention preferably includes a series of basic and independent novel features, one of which is the construction of the float with an annular water inlet into a hollow interior thereof formed by an upper part skirt-like partially telescoping a lower part establishing the annular water inlet therebetween for thereby providing an increased, but closely regulated ballast and more positive valve control, while still providing the proper required float flotation. Another basic novel feature is the incorporation internally of the float of a tubular air vent opening upwardly through the float and opening downwardly interiorly of the float so as to exactly establish the air buoyancy and the water ballast ratio within the float, again for more positive and predictable valve control. Still another independent novel feature of the present invention is the separate construction of the float upper and lower parts in a form quickly assemblable in proper permanently assembled form with various part components insuring such proper assembly and the exact functioning of the finally assembled float elements.

There are many occasions in each of home, farm and industrial use where it is desirable to control the flow of a liquid, most frequently water, into, through or from tanks and other receptacles by use of a float actuating a liquid level controlling valve. For instance, one of the most common such arrangements with which the average person is involved in his day-to-day life is the controlling of the water level in toilet flush tanks. The float is installed in the flush tank operably connected to a water inlet valve which normally maintains a constant water level within the tank and automatically actuates the water inlet valve to refill the flush tank upon the occasions of the connected toilet being flushed.

In toilet flush tank floats and floats for use in maintaining liquid levels in all of the other various applications, two basic required features are involved if proper water or other liquid level is to be maintained. One feature is that the float must have proper flotation so as to move precisely with the water level and so as to be positioned for constant sensing of such water level regardless of frequent changing of the same. Furthermore, the float must have sufficient ballast, most usually supplied primarily by a portion of the water supply being controlled, balanced with sufficient flotation, so that the water level controlling valve is positively actuated both in opening and closing and on a positively predictable basis. For instance, in most cases, the float is automatically filled to a determined level from water within the tank and at least a part of the remainder of the float traps air therein, the weight of the float contained water serving as the predetermined ballast for actuating the float controlled valve in the one direction and the buoyancy supplying the force for actuating the float controlled valve in the other direction, thereby an overall tank water level regulation.

One common deficiency of many of the prior float constructions is an insufficiency of buoyancy incorporated with the float. The buoyancy of the float, coupled of course with the ballast thereof, determines the action of the float within the water or other liquid and if the buoyancy is deficient, the float will not move with the water level and the valve action is not controlled exactly the same for each valve operation resulting in varying tank water levels. In case of toilet flush tanks, this deficiency can result in one flushing action making use of a large amount of water far in excess of that actually required for the purpose, while the next flushing action may only have a small amount of water not adequate for a proper flushing action.

At the same time, improperly controlled ballast of a given float can produce similar results. For instance, if, as is common, the ballast is supplied by a portion of the water from the tank, variations in such ballast from time to time can directly affect the flotation since the proper ratio between ballast and buoyancy of predictable quantity is necessary for predictable float action. EVen where the quantity of ballast is completely isolated from and has no determination of the flotation, if the ballast is formed by contained water or other liquid, variations in such contained water will still have a varying effect on the float action, if only by a variation in the weight thereof from one valve operation to the next.

Still further, since the forces exerted by the float in each of its upward and downward movement directions directly determines the forces exerted on the valve for actuating the same so as to determine the positiveness of such valve operating actions, even if the flotation and ballast forces are sufficient for causing the float to exactly follow the water level, the flotation and ballast forces still may not be sufficient in magnitude to supply valve opening and closing forces without erratic valve action. Thus, it can be seen that not only must a constant ratio between buoyancy and ballast be maintained for proper float and valve operation, but also sufficient predetermined quantities of buoyancy and ballast must be supplied in order that the valve being controlled will have a predictable and positive operation in both opening and closing actions. Insufficient float forces in either direction may create serious malfunctions.

Overall, therefore, for a satisfactory operating float controlling system, all of the above deficiencies must be eliminated, but equally important, the float must still be capable of economic manufacture including actual formation thereof and the various assembly operations. If the float construction is inordinately complex in configuration, it is difficult and expensive to form the various parts thereof, even where the parts are purely of a type capable of being formed by injection molding. The float parts must likewise be relatively easily assembled with a minimum of tolerance limitations being required to be adhered to by the assembling workmen during such assembly. This latter requirement is additionally important since the less complexity to the assembly operations, reduces the training snd skill required by the particular assembling workman and if the complexity of assembly is reduced to a minimum, minimal workman training and skills are required without the danger of the possibility of serious assembly mistakes.

OBJECTS AND SUMMARY OF THE INVENTION

It is, therefore, an object of this invention to provide a float for controlling the valves of ball cocks and the like which is formed of uniquely arranged components giving increased positive valve control in both directions of valve movement, thereby resulting in a maximum predictability of water or other liquid level control. According to certain of the unique principles of the present invention, a maximum of ballast is supplied within a reasonable float size so as to provide the needed weight for positively operating the controlling valve in the one direction. At the same time, despite the increased weight of ballast, the flotation qualitites of the float are not sacrificed and the float likewise positively operates the valve in the opposite direction.

It is a further object of this invention to provide a float for controlling the valves of ball cocks and the like wherein the ballast for the float is supplied by a portion of the water from the water tank within which the float is installed, the float thereby controlling the water level of such tank, and due to the novel formation of the float, complete uniformity of ballast is always assured, as well as uniformity of flotation preferably provided by float trapped air. In the preferred embodoiment of the float of the present invention, the float is formed with a skirt-like annular water inlet of maximum size resulting in a constant quantity of water always being admitted to and contained within the float. Furthermore, according to another unique feature, an internally formed air outlet tube of the float automatically determines the water ballast and air flotation levels within the float for complete uniformity of controlled valve action.

It is also an object of this invention to provide a float for controlling the valves of ball cocks and the like which satisfies all of the foregoing, yet in the preferred embodiment form is constructed of two assembled parts which, when brought into the assembled state, assure absolute uniformity of structure one float to the next and thereby completely predictable performance one float to the next. According to certain features of such preferred embodiment form, a float upper part has inwardly projecting portions upwardly abutted by a lower part during assembly of the float so as to exactly place the respective parts relatively uniformly positioned and the air outlet tube of the upper part in an exact position relative to the lower part. In addition, certain float portions during such assembly are preferably positioned extending transversely between the upper and lower float parts at the annular water inlet so as to automatically define such inlet between the parts and assuring water inlet uniformity. Thus, with the controlling water inlet and air outlet tube always of determined size and positioning, virtually identical performance, one float to the next, is always obtained.

It is still another object of this invention to provide a float for controlling the valves of ball cocks and the like wherein, in the preferred embodiment form, with the float formed of two assembled parts, snap engagement means may be provided between the two float parts such that the final assembly operation is an extremely simple and virtually foolproof assembly operation, while still creating the advantageous final float structure as hereinbefore pointed out. Each of the float parts preferably includes portions of internal telescopically interengaging elements which, when brought into cooperating assembly, automatically securely interengage retaining the overall assembly in properly operable form. In the case where the float is of the type telescoping and moving generally vertically along an upright guide member of a ball cock or the like during valve controlling movement, the float part interengaging portions in the final assembly form the guide passage through the float for the upright guide member resulting in a float of maximum compactness and ease of formation, while still retaining all of the advantageous features as hereinbefore discussed.

Other objects and advantages of the invention will be apparent from the following specification and the accompanying drawing which are for the purpose of illustration only.

Figure 1:
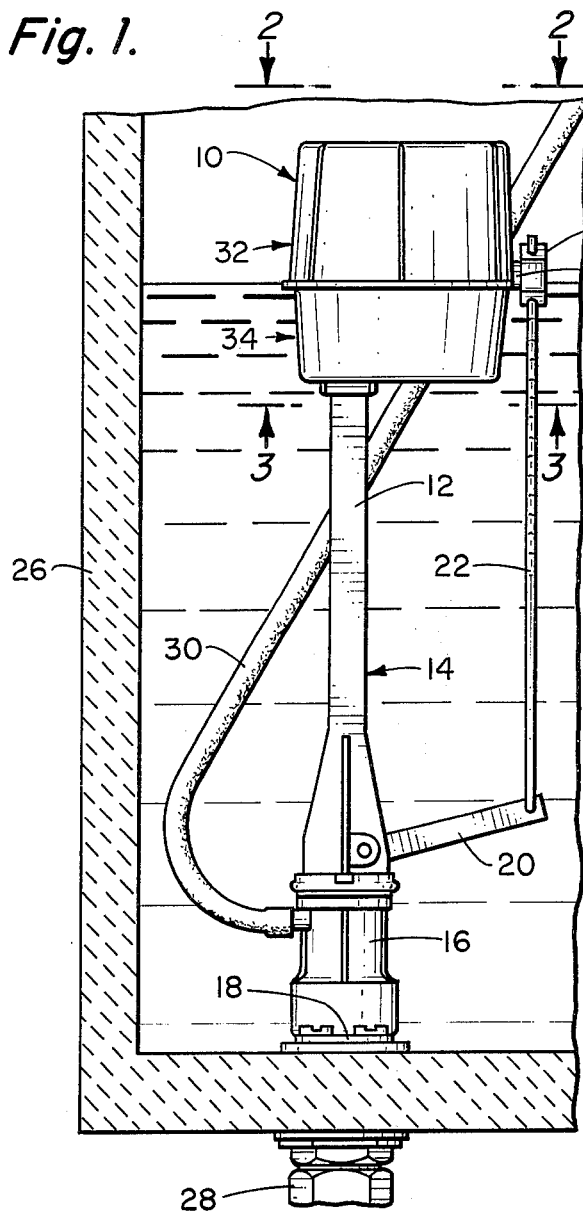
FIG. 1 is a fragmentary, side elevational view, part in section, showing a preferred embodiment of the float of the present invention installed on a typical ball cock controlling the valve of such ball cock and thereby controlling the water level in a typical toilet flush tank.
Figure 2:
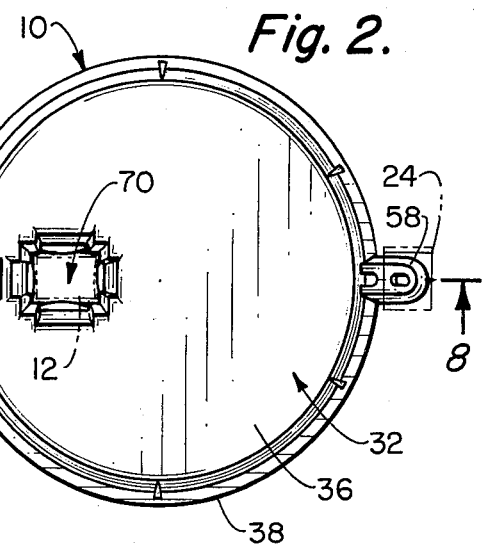
FIG. 2 is an enlarged, top plan view of the float of FIG. 1 removed from the ball cock and looking in the direction of the arrows 2—2 in FIG. 1.
Figure 3:
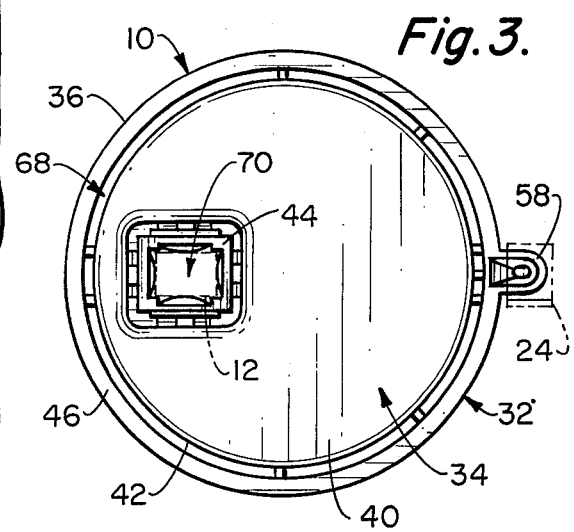
FIG. 3 is an enlarged, bottom plan view of the float of FIG. 1 removed from the ball cock and looking in the direction of the arrows 3—3 in FIG. 1.

DESCRIPTION OF THE BEST EMBODIMENT CONTEMPLATED:

Referring to the drawings, a typical example of use of the float construction principles of the present invention is shown in FIG. 1 wherein a preferred embodiment of a float is generally indicated at 10 vertically movably guided on an upright guide 12 of a typical ball cock generally indicated at 14, the ball cock having a valve section 16 with a water outlet 18 and a vertically pivotal valve operating lever 20. The valve operating lever 20 is, in turn, pivotally connected at its projecting end to a link 22 extending vertically upwardly and adjustably connected to the float 10 by a clip 24. The ball cock 14 is mounted in a typical toilet flush tank 26 by sealed securement to a water inlet pipe 28 and a usual flexible refill hose 30 connected to the ball cock valve section 16 is extended upwardly and into the usual upright toilet refill tube (not shown).

In general ball cock operation, therefore, as installed in this environment of the toilet flush tank 26, the constant supply of water under pressure is admitted through the water inlet pipe 28 to the ball cock valve section 16 and through such valve section outwardly of the outlet 18 into the confines of the flush tank 26. The water level in the flush tank 26 rises carrying the float 10 until the float, through the link 22 and valve operating lever 20 closes the ball cock valve at the valve section 16, the float thereby establishing the determined water level within the flush tank. During the period that the water passes through the ball cock valve section 16, a portion thereof flows through the refill hose 30 and ultimately into the toilet (not shown) for maintaining a quantity of water therein in the usual manner. Also, when the toilet is flushed by opening the a dump valve (not shown) in the flush tank 26 causing the major portion of the water within the flush tank to flow therefrom, the float 10 sliding downwardly on the guide 12 and following the decreasing water level, opens the valve within the ball cock valve section 16 to admit a further quantity of water with the valve closing operation ultimately taking place as hereinbefore described.

Although the preferred embodiment of the novel float 10 of the present invention is herein illustrated for use with the ball cock 14 in the toilet flush tank 26 controlling the water level in such toilet flush tank, it should be understood that the principles of the present invention are equally advantageously applicable to many other float uses and controlling various other liquids in addition to water. For instance, there are many other applications in both industry and on farms where it is desirable to control and maintain liquid levels in tanks and the like, and the float principles of the present invention can be readily adapted to such uses. Thus, where the terms "ball cock", "water", "air" and other specific terms are used herein and in the appended claims, such terms should be broadly and liberally construed, since it is not intended by such specific terminology to limit the principles of the present invention to the illustrated application.

More particularly to the float principles of the present invention, the float 10, as shown in FIGS. 1 through 8, includes a hollow, generally cylindrical, upwardly closed and downwardly open upper part generally indicated at 32 and a hollow, generally cylindrical, downwardly closed and upwardly open lower part generally indicated at 34. The upper part 32 is, therefore, generally inverted cup-shaped formed by a generally flat upper end 36 and generally vertical side wall 38 and the lower part 34 is, therefore, generally cup-shaped formed by a generally flat lower end 40 and generally vertical wall 42, the upper part being of slightly greater horizontal or transverse cross-sectional dimensions than the lower part 34 for a purpose to be hereinafter described. In manufacture, the upper and lower parts 32 and 34 may be injection molded from usual plastics by usual high production methods.

Referring specifically to FIGS. 1, 2, 4 and 6 through 8, the upper part 32 includes a guide post 44 formed tubular of generally rectangular cross-section internally thereof and spaced inwardly from the upper part side wall 38 projecting downwardly from the upper part upper end 36 to spaced downwardly of a uniform lower edge 46 of the upper part side wall 38. The guide post 44 is appropriately reinforced in its extension downwardly from the upper part upper end end and is open downwardly at its termination space below the side wall lower edge 46. Important to the snap engagement assembly feature of the present invention as will be hereinafter described, the guide post 44 is also formed with engagement slots 48, one in each of the four guide post walls uniformly spaced slightly upwardly from the lower termination of the guide post and also spaced below the uniform lower edge 46 of the upper part side wall 38.

As best seen in FIGS. 2, 4 and 6 through 8, a tubular air vent 50 is formed positioned between the guide post 44 and the upper part side wall 38 likewise internally of the upper part 32 opening upwardly through the upper part upper end 36 and terminating downwardly, as well as opening downwardly, spaced a predetermined distance upwardly from the side wall lower edge 46. Important to proper functioning of the float 10, this upper part air vent 50 is closed off from the remainder of the interior of the upper part 32 except for its downward opening at its lower termination. Furthermore, with the tubular air vent 50 directly adjacent the upper part side wall 38, the predetermined termination thereof spaced slightly upwardly from the side wall lower edge 46 places this tubular air vent lower termination or edge as a vertical abutment surface for a purpose to be hereinafter described.

Figure 4:
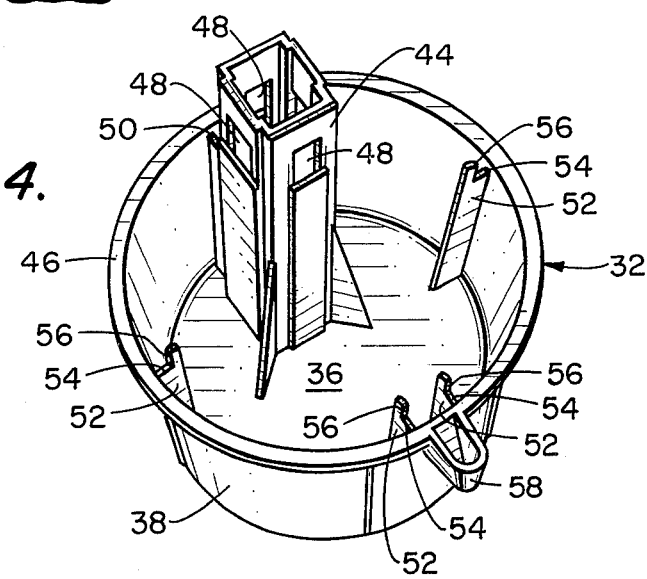
FIG. 4 is a bottom perspective view of an upper part of the float of FIGS. 2 and 3, the upper part removed from a lower part thereof and illustrating internal structure of the upper part prior to assembly.
Figure 5:
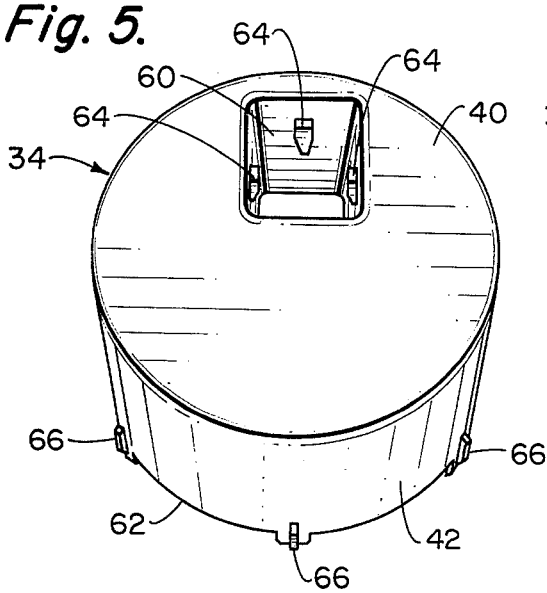
FIG. 5 is a bottom perspective view of the lower part of the float of FIGS. 2 and 3, the lower part removed from the upper part and illustrating certain of the lower part structure prior to assembly.

The upper part 32 is completed by a series of spaced positioning portions 52 extending generally vertically along the interior of the upper part side wall 38. These positioning portions 52 terminate downwardly in generally horizontally extending abutment surfaces 54 extending transversely inwardly from the upper part side wall 38 spaced upwardly from the side wall lower edge 46 the same predetermined distance as the lower termination of the tubular air vent 50. At the inner termination of the abutment surfaces 54 the positioning portions 52 extend slightly downwardly forming generally vertical inward retaining surfaces 56. It will be noted, as shown in FIG. 4, that two of the positioning portions 52 are located directly inwardly from an upper part valve control lug 58 projecting outwardly from the upper part side wall 38 for connection to the link 22 by the clip 24 in the usual manner, the positioning portions 52 reinforcing this valve control lug 58.

Referring particularly to FIGS. 1, 3 and 5 through 8, the float lower part 34 includes a guide post 60 formed tubular and generally rectangular in cross section, but slightly larger dimensions than the upper part guide post 44 sufficient for closely telescoping the upper part guide post. The lower part guide post 60 extends generally vertically internally of the lower part 34 opening downwardly through the lower part lower end 40 and opening upwardly at its upper termination coextensive with a uniform upper edge on the lower part 34. The lower part guide post 60 is spaced inwardly of the lower part side wall 42 and vertically aligned with the upper part guide post 44 when the float 10 is in assembled condition as will be hereinafter described.

Important to the snap engagement assembly features of the float 10, the lower guide post 60 is formed with inwardly extending engagement tabs 64, one on each of the guide post walls extending a determined distance inwardly and all spaced a predetermined distance above the lower termination of the guide post 60 or the lower part lower end 40. Likewise important to the assembly positioning of the float 10, a series of spacing portions are formed spaced about the lower part side wall 42 projecting horizontally or transversely outwardly from the side wall just beneath the side wall upper edge 62. These spacing portions 66 are necessarily positioned so as not to interfere with the upper part positioning portions 52 during assembly of the float 10, such assembly to be described below.

Figure 6:
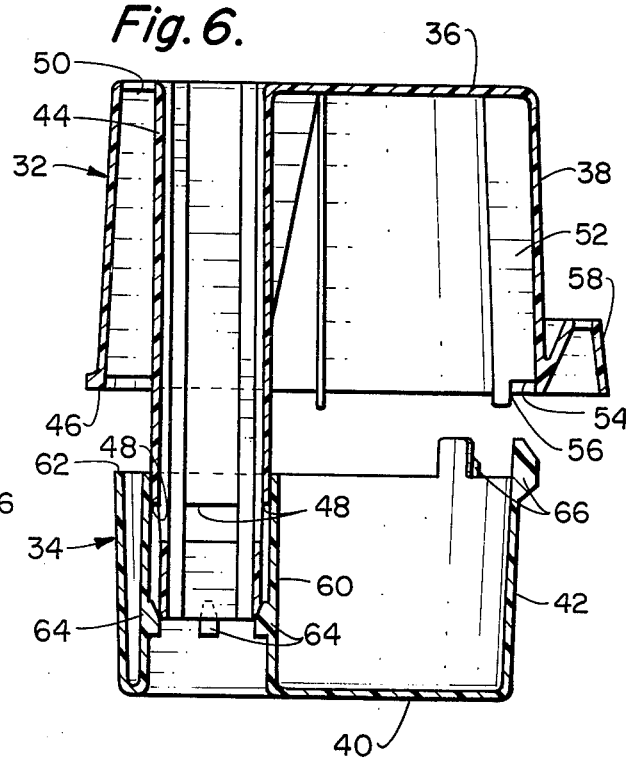
FIGS. 6, 7 and 8 are vertical sectional views of the float of FIGS. 2 and 3 illustrating the assembly step of the float parts of FIGS. 4 and 5, FIG. 6 showing the start of the assembly step, FIG. 7 showing the assembly step progressing but not complete, and FIG. 8 showing the assembly step completed and the assembled float.
Figure 7:
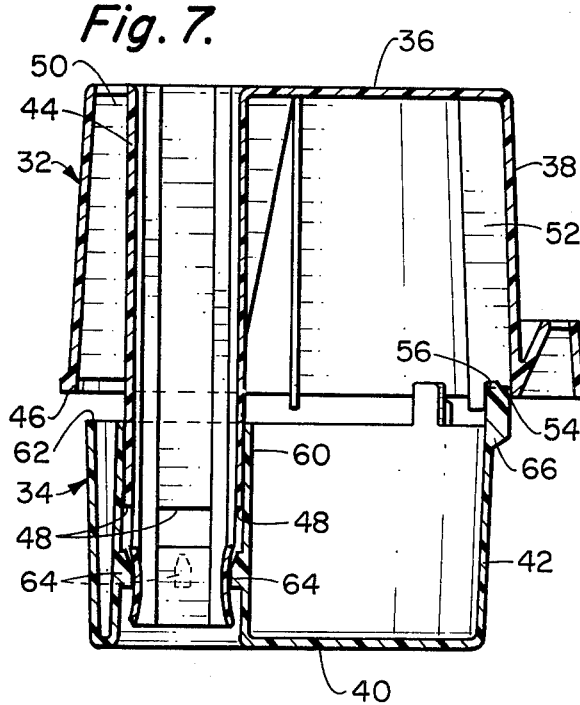
Figure 8:
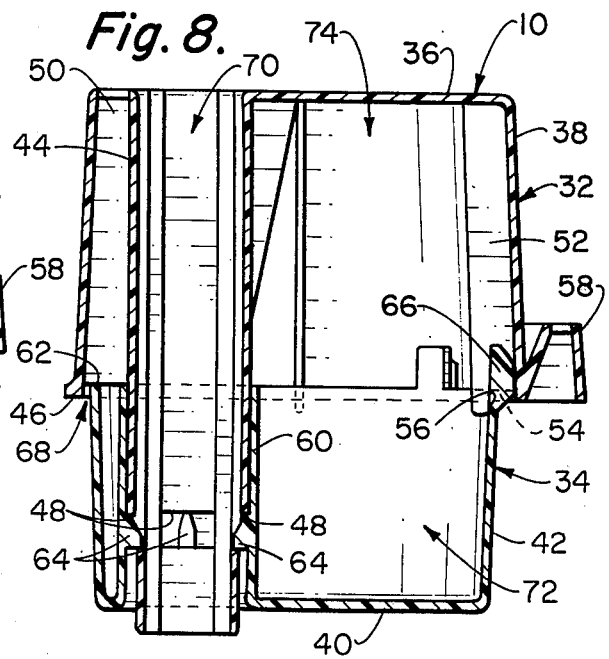

Shown in FIGS. 6 through 8 are the progressive snap engagement assembly and positioning steps for the float 10 and as shown in FIG. 6, the upper part 32 is positioned over the lower part 34 and the upper part guide post 44 is inserted downwardly into the lower part guide post 60. In FIG. 6, the lower extremity of the upper part guide post 44 is just beginning to engage the engagement tabs 64 of the lower part guide post 60. At this stage, the uniform lower edge 46 of the upper part 32 is spaced upwardly from and outwardly of the uniform upper edge 62 of the lower part 34.

As shown in FIG. 7, as pressure is exerted downwardly on the upper part 32, flexing between the respective part guide posts 44 and 60 permits the engagement tabs 64 on the lower part guide post 60 to ride outwardly vertically along the outer surface of the guide post 44 of the upper part 32 still below the engagement slots 48 of the guide post 44. But during this further telescoping of the respective guide posts, the respective part uniform upper and lower edges 46 and 62 are more closely approaching, still spaced trasversely apart, and it is now seen that the lower part upper edge 62 is approaching the abutment surfaces 54 on the upper part positioning portions 52, as well as approaching the lower termination edge on the upper part air vent tube 50.

Finally, in fully assembled position of the float 10 as shown in FIG. 8, the lower part guide post 60 fully telescopes the upper part guide post 44 with the upper part guide post projecting slightly spaced downwardly at its lower termination from the lower part lower end 40. Also, the engagement tabs 64 of the lower part guide post 60 snap engage transversely into the engagement slots 48 of the upper part guide post 44 securing the upper and lower part guide posts 44 and 60 in their assembled telescoped relationship, it being noted as shown in FIG. 8, that the lower edges of the engagement tabs 64 engaging with the lower edges defining the engagement slots 48 retain and prevent withdrawal of the upper part guide post 44 from the lower part guide post 60.

During this snap engagement and retention between the telescoped upper and lower part guide posts 44 and 60 as a result of these guide posts being permitted to return to original shape from their described flexing, the upper part uniform lower edge 46 telescopes downwardly spaced outwardly of the lower part uniform upper edge 62 a determined distance as determined by the lower part uniform upper edge 62 engaging abuttingly upwardly against the positioning portion abutment surfaces 54 and the lower extremity edges of the air vent tube 50 on the upper part 32. At the same time, as the upper and lower parts 32 and 34 partially telescope as exactly determined by the abutment surfaces as described, the lower part spacing portions 66 come into transverse outward abutment with the inner surface of the upper part side wall 38 and the inward retaining surfaces 56 of the upper part positioning portions 52 come into transverse outward abutment with the inner surface of the lower part side wall 42 thereby retaining the upper and lower part side walls 38 and 42 in an exact transverse spacing so as to define an exact, somewhat circuitous, annular slot therebetween communicating from outwardly into the interiors of the upper and lower parts 32 and 34 as indicated generally at 68 in FIGS. 3 and 8.

Thus, during the described snap engagement assembly of the upper and lower parts 32 and 34, the various cooperatitng elements of the upper and lower parts guide the upper part 32 into a skirt-like downward telescoping spaced outwardly of the lower part 34 forming the annular slot or annular water inlet 68 therebetween into the now closed interiors of the upper and lower parts. In addition to the formation of the annular water inlet 68 formed by such unique assembly, the lower extremity of the air vent tube 50 interiorly of the upper part 32 is positioned downwardly primarily communicating into the closed interior of the lower part 34 as clearly shown in FIG. 8 so that there is communication from the lower part interior upwardly through the air vent tube 50 and through the upper part upper end 36 while the interiors of the upper and lower part guide posts 44 and 60 are completely isolated from the upper and lower part interiors although providing a guide passage generally indicated at 70 completely vertically through the float 10.

In use, the float 10 is assembled with the ball cock 14 by downward telescoping of the float over the guide 12 as shown in FIG. 1, the guide 12 being received upwardly throuogh the guide passage 70 so that the float is vertically movable therealong. The upper end of the wall cock link 22 is received upwardly through the float valve control lug 58 and retained properly positioned by the clip 24, the link 22 being adjustable relative to the float 10 by manipulating the clip 24 in the usual manner. The float 10 is then forced downwardly in the water of the flush tank 26 so that the water level is above the float annular water inlet 68 causing the water to enter the float 10 through the annular water inlet 68 filling the float lower part 34 by displacing the air therein and forcing such air upwardly through the upper part air vent tube 50. The float 10 is then released and is ready for its proper functional operation.

During operation of the float 10, the float lower part 34 filled with water forms the ballast for the float 10 so that the interior of the lower part becomes a ballast chamber generally indicatd at 72, and the air trapped in the interior of the upper part 32 above the lower part uniform upper edge 62 forms the flotation for the float 10 with the upper part interior becoming a flotation chamber generally indicated at 74. The float 10, therefore, provides a relatively large flotation chamber 74 for supplying positive forces to carry the float exactly with the water level in the flush tank 26 and positively close the valve within the ball cock valve section 16 when the predetermined upper water level is reached. At the same time, the relatively large ballast chamber 72 supplies positive forces downwardly carrying the float 10 downwardly as the flush tank water level decreases to positively open the ball cock valve for the water refilling action. With the unique and extensive annular water inlet 68 as hereinbefore described, and the ready exhaust of air upwardly through the air vent tube 50 on the float upper part 32, there is always full assurance that the ballast chamber 72 will always be maintained full at its exact upper level, the uniform upper edge 62 of the lower part 34, for completely predictable float action. It will be noted, however, that this ballast chamber and flotation chamber relationship is always maintained despite the fact that the maximum generally horizontal cross section of the interior of the air vent tube 50 is equal to only a small portion of an average generally horizontal cross section of the body hollow interior as is clearly shown in FIG. 8.

According to the present invention, therefore, a float 10 is provided for controlling the valves of ball cocks and the like, and applicable to many other uses, which provides uniquely formed ballast and flotation chambers 72 and 74 giving increased positive valve control in both directions of valve movement so as to result in a maximum predictability of water or other liquid level control over that heretofore possible with prior float constructions. Furthermore, due to the unique formation of the float 10, the flotation and ballast of the float is constantly maintained at a predetermined ratio level so as to always provide exactly predetermined float performance. Still in addition, again due to the unique formation of the float 10, novel forms of manaufacture and assembly methods are presented reducing the cost of manfacture to a minimum and of a virtually foolproof nature.

We claim:

1. In a float of the type for use with ball cocks and the like in controlling the water level in tanks; the combination of: a body having a hollow interior including an upper part partially downwardly telescoping over a lower part with said lower part spaced inward of said upper part forming a generally annular water inlet therebetween opening into said body hollow interior; said body hollow interior extendig into said body lower part forming a ballast chamber in communication with said water inlet; a tubular air vent extending downwardly through said body interior having a lower end opening into said body interior intermediate said body vertical height and an upper end opening outwardly of said body spaced above said water inlet, a maximum generally horizontal cross section of an interior of said tubular air vent being equal to only a small portion of an average generally horizontal cross section of said body hollow interior; said body hollow interior being formed as a closed chamber other than said water inlet and said tubular air vent lower end.

2. In a float as defined in claim 1 in which said body includes said upper part having inwardly projecting portions seating downwardly against an upper edge of said lower part determining said telescoping of said upper part over said lower part.

3. In a float as defined in claim 1 in which said body includes said lower part having an upper edge with spaced outwardly projecting portions outwardly abutting a lower surface of said upper part telescoped thereover maintaining spacing between said upper and lower part edges.

4. In a float as defined in claim 1 in which said body includes said upper part having inwardly projecting portions seating downwardly against an upper edge of said lower part determinig said telescoping of said upper part over said lower part, said lower part having an upper edge with spaced outwardly projecting portions outwardly abutting a lower surface of said upper part telescoped thereover maintaining spacing between said upper and lower part edges.

5. In a float as defined in claim 1 in which said lower end of said tubular air vent opens into said body interior at said annular water inlet.

6. In a float as defined in claim 1 in which said lower end of said tubular air vent opens into said body interior at said annular water inlet; in which said body upper and lower parts are generally cylindrical opening downwardly and upwardly respectively and with generally horizontal upper and lower ends respectively; and in which said upper end of said tubular air vent opens outwardly of said body upper part through said upper end of said upper part.

7. In a float as defined in claim 1 in which tubular guide sleeves are formed interiorly of each of said body upper and lower parts telescopically engaging during assembly of said parts into a unitary assembled body having said hollow interior; and in which cooperating self-locking snap engagement portions are formed on each of said tubular guide sleeves of said body upper and lower parts snap inter-engaging and locking said body parts into said unitary assembled body.

8. In a float as defined in claim 1 in which tubular guide sleeves are formed interiorly of each of said body upper and lower parts telescopically engaging during assembly of said parts into a unitary assembled body having said hollow interior; in which cooperating self-locking snap engagement portions are formed on each of said tubular guide sleeves of said body upper and lower parts snap inter-engaging and locking said body parts into said unitary assembled body; and in which said lower end of said tubular air vent opens into said body interior at said water inlet annular opening.

9. In a float of the type for use with ball cocks and the like in controlling the water level in tanks; the combination of: a body having separately formed upper and lower parts; ballast means operably associated with said body for weighting said body sufficient to actuate a valve; buoyancy means operably associated with said body for floating said body sufficient to actuate said valve; cooperating self-locking snap engagement portions on each of said body upper and lower parts snap inter-engaging and locking said body parts into a unitary assembly; generally vertical tubular guide portions formed interiorly of each of said body upper and lower parts telescopically engaging during said part assembly into said unitary assembly; one of said tubular guide portions extending vertically generally throughout said part unitary assembly and the other of said tubular guide portions telescoping thereover.

10. In a float as defined in claim 9 in which said body upper and lower parts are generally hollow cylindrical downwardly and upwardly opening with generally closed upper and lower ends respectively forming said unitary assembly having a hollow interior.

11. In a float of the type for use with ball cocks and the like in controlling the water level in tanks; the combination of: a body having upper and lower parts; said body upper part being inverted cup-shaped opening downwardly; said body lower part being cup-shaped opening upwardly; said body upper part being positioned skirt-like downwardly over and downwardly overlapping said body lower part with said upper part spaced outwardly of said lower part forming a generally annular slot therebetween opening into interiors of said parts, said annular slot constituting water inlet means with ballast chamber means at a lower portion of said body and flotation chamber means at an upper portion of said body.

12. In a float as defined in claim 11 in which said body lower part has an upper edge with spaced outwardly projecting portions outwardly abutting a lower surface of said upper part telescoped thereover maintaining spacing between said upper and lower part edges for said annular slot.

13. In a float as defined in claim 11 in which said body upper part has inwardly projecting portions seating downwardly against an upper edge of said body lower part determining said telescoping of said upper part downwardly over said lower part with said annular slot therebetween.

14. In a float as defined in claim 11 in which said body lower part has an upper edge with spaced outwardly projecting portions outwardly abutting a lower surface of said body upper part telescoped thereover maintaining said spacing between said upper and lower parts for forming said annular slot; and in which said body upper part has inwardly projecting portions seating downwardly against said upper edge of said body lower part determining said telescoping of said upper part over said lower part with said annular slot therebetween.

* * * * *